June 27, 1961     S. F. REED     2,989,909
PHOTOGRAPHIC METHOD
Filed June 17, 1957
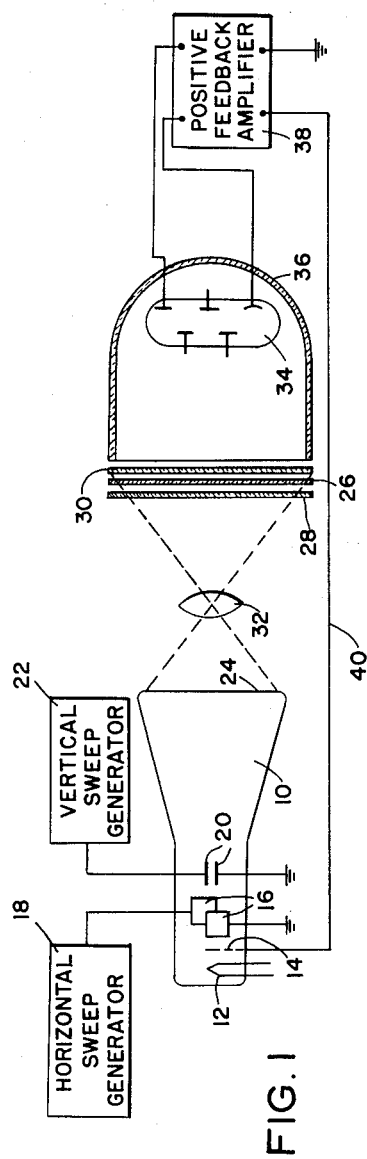
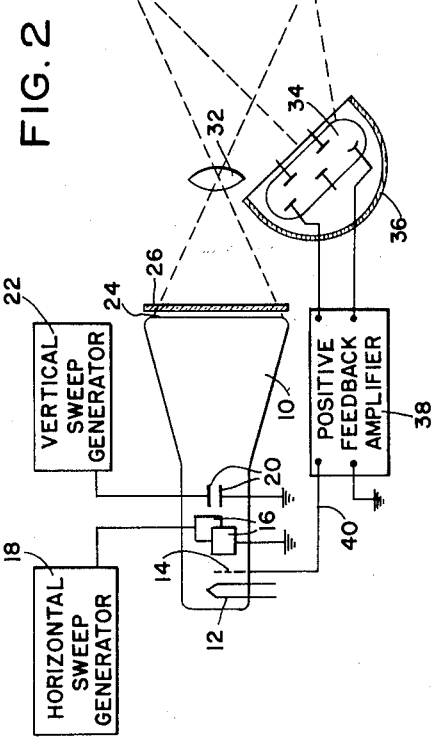
INVENTOR
STANLEY F. REED
BY Raymond W Cotton
ATTORNEY

2,989,909
PHOTOGRAPHIC METHOD

Stanley F. Reed, Falls Church, Va., assignor to Logetronics, Inc., Alexandria, Va., a corporation of Delaware Filed June 17, 1957, Ser. No. 666,125
1 Claim. (Cl. 95—73)

This invention relates to a method for improving the contrast of photographically reproduced material.

Previously, the function of this invention has been sought by the use of mechanical dodging, special high-contrast photographic paper, and manual retouching of photographic film. The disadvantages of these known methods have been the length of time required to perform the work and the inexactness of the results. Dodging has also been achieved electronically as disclosed in the copending application of Dwin R. Craig, Serial No. 453,747, filed September 2, 1954, now Patent No. 2,842,025, but this method tends to give uniformly exposed prints, which, in an extreme case, would be completely gray, thereby eliminating contrast.

The present invention employs apparatus similar to that of said application but differs in the use of positive feed-back from the phototube to the cathode ray tube to modulate the light beam. As the light beam enters an area of relatively greater subject opaqueness it is decreased in intensity for example, thereby decreasing the amount of light on the photosensitive surface, so that a darker image is produced on that surface. As the light beam enters an area of relatively greater transparency, it is increased in intensity for example, thereby increasing the amount of light on the photosensitive surface so that a brighter image is produced on the surface. In this way, contrast between the two areas will be improved. A reference voltage may be used to indicate the transition point from the opaque to the transparent and it may be desirable to use a derivative of the signal in order to control the extent to which the scanning beam is modified.

It is among the objects of this invention to provide a photographic method comprising energizing a light source to produce a variable light beam, directing the beam to illuminate a portion of a subject with a spot of finite area, scanning the subject with the spot and directing light from each portion of the subject to form a real image on a photosensitive surface to expose the same, directing light from the photosensitive surface to a light intensity sensing device, and modifying the light beam as a positive function of the sensed intensity to produce a print of relatively high contrast. The characteristic of the beam modified as a function of the sensed intensity may be the intensity of the beam and/or the area of the spot produced thereby. The photosensitive surface is exposed to light transmitted from each portion of the subject by light directed through the subject. The light directed to the sensing device may be transmitted through the photosensitive surface or reflected therefrom. The light source is preferably a cathode ray tube of the kinescope type. Preferably, the subject is scanned in two dimensions along paths, such as sine waves or triangular waves, having substantially linear components whose ratio of repetition rates is other than an integer. In this way, the entire area of the subject will be covered and no fixed line pattern established.

A more complete understanding of the invention will follow from a description of the accompanying drawing wherein:

FIG. 1 is a diagrammatic illustration of the use of the invention for contact printing from a photographic transparency; and FIG. 2 is a diagrammatic illustration of an arrangement used for projection printing.

A cathode ray tube or kinescope 10 is provided with a cathode 12, a control grid 14, deflection plates 16 connected in circuit with a horizontal sweep generator 18, and deflection plates 20 connected in circuit with a vertical sweep generator 22. The electron beam produced by the tube produces light on a fluorescent screen 24 provided at the end of the tube from which light is directed through a photographic transparency 26 interposed between a glass plate 28 and a photosensitized surface 30 on which the ultimate print will be formed. Intermediate the glass supporting plate 28 and the cathode ray tube, a lens 32 has been shown for use where the fluorescent screen of the cathode tube is smaller than the transparency 26 to be reproduced. Where the cathode tube has a screen as large as or larger than the transparency 26, the lens 32 can be omitted. Beyond the photosensitized surface 30 in the light path, a photomultiplier tube 34 is provided within a light collector 36 so as to sense the intensity of light transmitted from the sensitized surface, in this case by penetration. The output of the photomultiplier tube 34 is connected to a positive feed-back amplifier 38, whose level can be adjusted in a conventional manner, the output of the amplifier being connected through a conductor 40 with the grid 14 of the cathode ray tube to produce a positive feed-back effect by which the contrast of the print produced will be high as compared with that of the transparency from which it is produced. Similarly, the output of the amplifier 38 is applicable to the enhancement of contrast by modification of the scanning speed and/or the spot size as a positive function of the light intensity sensed by the photomultiplier tube.

The arrangement depicted in FIG. 2 of the drawing illustrates projection printing on a photosensitized surface which is opaque to the light directed thereon by the cathode ray tube 10. In this case, the area of the print to be formed on the photosensitized surface 42 exceeds that of the transparency 26, the lens 32 producing the necessary enlargement. Inasmuch as the support for the photosensitized element 42 is opaque to light produced by the cathode ray tube, reflected light transmitted therefrom impinges on the photomultiplier tube 34 housed within the collector 36 to supply the positive feed-back amplifier 38 which in turn produces the positive feed-back on the control grid 14 of the cathode ray tube to again assure a substantial increase in contrast of the print as compared with that of the transparency. It will be understood of course, that the substitution of a suitable lens will permit reduction by the projection printing arrangement of FIG. 2.

Other variations already recognized by the present inventor will suggest themselves to those skilled in the art and accordingly, the invention should not be limited to the two forms illustrated beyond the scope of the appended claim.

I claim:

A photographic method comprising energizing a light source to produce a variable light beam of constant color, directing said beam to illuminate an elemental area of a subject, scanning said subject with said beam and directing a portion of said light from each elemental area of said subject to form a real image on a photosensitive surface to expose the same, directing a portion of said light from each elemental area of said subject to a light intensity sensing device, and continuously modifying the product of said intensity and exposure time of said light beam as a positive function of and simultaneously with changing values of the sensed intensity to produce exaggerated exposure differences between elemental areas of the photosensitive surface, wherein the speed of the scanning beam is modified as a function of the sensed intensity.

References Cited in the file of this patent

UNITED STATES PATENTS

| | | |
|---|---|---|
| 2,484,299 | Labrum | Oct. 11, 1949 |
| 2,565,399 | Simmon | Aug. 21, 1951 |
| 2,691,917 | Curry | Oct. 19, 1954 |
| 2,757,571 | Loughren | Aug. 7, 1956 |
| 2,764,060 | Horak | Sept. 25, 1956 |
| 2,842,025 | Craig | July 8, 1958 |
| 2,921,512 | Craig | Jan. 19, 1960 |

FOREIGN PATENTS

| | | |
|---|---|---|
| 713,285 | Great Britain | Aug. 11, 1954 |